June 25, 1929.　　　R. S. THORESEN　　　1,718,766
LUBRICATING SYSTEM FOR OIL BURNERS
Filed July 1, 1927
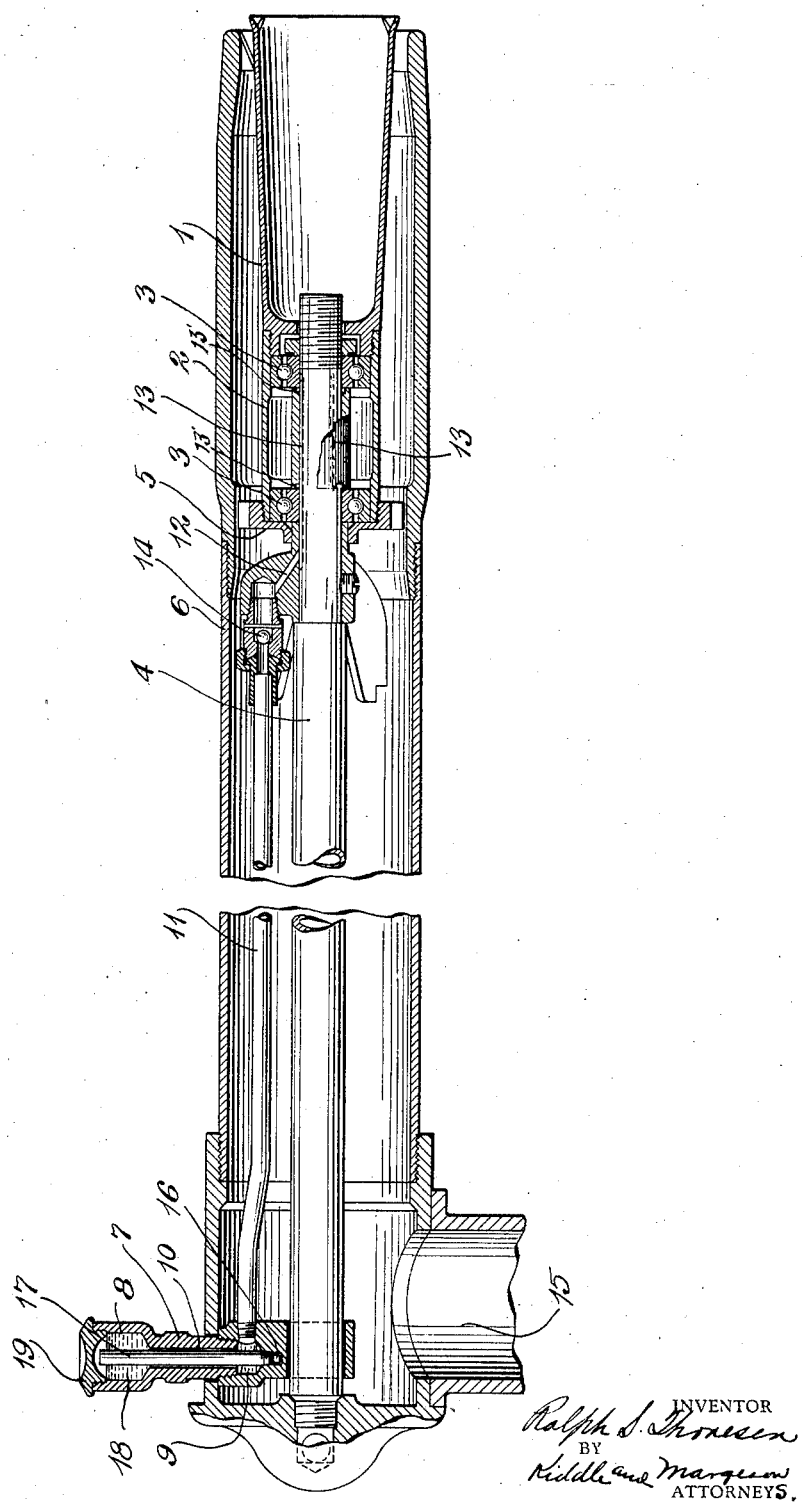

Patented June 25, 1929.

1,718,766

UNITED STATES PATENT OFFICE.

RALPH S. THORESEN, OF BOSTON, MASSACHUSETTS, ASSIGNOR TO PETROLEUM HEAT AND POWER COMPANY, OF NEW YORK, N. Y., A CORPORATION OF DELAWARE.

LUBRICATING SYSTEM FOR OIL BURNERS.

Application filed July 1, 1927. Serial No. 202,793.

My invention relates to an improvement in lubricating systems for certain moving parts of burners employing a liquid as a fuel, such as oil burners, and has for one of its objects the provision of a construction which is extremely simple, positive in operation, and which will overcome certain difficulties in lubricating systems heretofore employed.

In the type of burner for which this construction has been particularly designed, although applicable to burners of other types, a rotatable atomizer or fuel cup is mounted for rotation within a tube or conduit through which a current of air under pressure is constantly fed while the burner is functioning.

One of the objects of my invention is to prevent an unbalanced pressure condition on the lubricant being fed to the bearings to be lubricated, in a direction to force the lubricant away from these bearings.

In burners of the type above referred to, it is desirable or may be desirable to employ oil cups or lubricant reservoirs of some nature whereby lubricant will be fed constantly and automatically to the bearings. In prior lubricating systems, difficulty has been experienced with the lubricant flow toward the bearing or bearings, owing to the unbalanced condition of the lubricant due to the current of air under pressure surrounding the bearings, and with forcing of the lubricant out of its cup or reservoir when the same is uncovered for any reason, as for replenishing the lubricant supply.

A further object of my invention is to remedy or overcome these inherent defects by providing a structure in which the air pressure on the lubricant in a direction to force the lubricant toward the bearings to be lubricated is not less when the device is in operation than the air pressure in the opposite direction, and to positively prevent reversed travel or "blow-back" of the lubricant when the lubricant reservoir is opened or uncovered.

In the accompanying drawing, wherein one embodiment of my invention has been illustrated in part sectional elevation, 1 designates a rotatable fuel atomizer or fuel cup provided with a rearward extension 2 having ball bearing mounts 3 on the forward end of a stationary oil tube or fuel tube 4, through which fuel is fed to the interior of the cup 1. The cup is provided with an air turbine 5, and inasmuch as the structure so far described is mounted within an air tube 6 through which air under pressure is projected when the burner is in operation, it will be understood that the cup will be caused to rotate on its bearings 3. Inasmuch as the cup and bearings are mounted within the tube 6, it will be apparent also that the bearings are subjected to the pressure of the travelling current of air passing through the tube 6, and unless means are provided to prevent it, the lubricant will be forced out of the bearings.

In the embodiment of my invention illustrated, I place an oil or lubricant cup or reservoir 7 in any convenient location with respect to the burner. This oil reservoir or cup is provided with an upper chamber 8 and lower chamber 9, these chambers communicating with each other at all times through a restricted passageway 10. The lower chamber 9 is positioned above the level of the bearings 3 and is connected thereto, through conduit 11, duct 12, and ducts 13 and 13', the lubricant contained within the reservoir 7 flowing by gravity to both sets of bearings 3 through the conduit and ducts just referred to.

The end of the conduit or pipe 11 remote from the oil cup or reservoir 7 is provided with a check valve, in this case a ball valve 14, seating in the end of the conduit when moved to the left, as viewed in the drawings, that is to say, when moved toward the lubricant reservoir or cup.

Air under pressure is fed to the interior of the tube 6 through the inlet 15 therein, and the interior of the tube 6 is at all times in communication with the interior of the lubricant reservoir or cup 7 through a port 16 communicating with a pipe or conduit 17 extending upwardly through the interior of the cup 7 from bottom to top thereof and to a point above the level of the lubricant 18 within the cup. The cup 7 is provided with a removable cap 19 and when the burner is in operation, this cap is in position thereon.

It will be apparent from the foregoing that by reason of the provision of the pipe 17 within the oil reservoir 7 and by maintaining the same in constant communication with the tube 6, the pressure on the lubricant 18 contained within the cup 7 will not at any time be less than the pressure on the lubricant due to the pressure created by the air passing through the tube 6 around the bearings 3. This being the case, the lubricant can flow by gravity through the conduit 11, past the ball valve 14, which will unseat, and to the bearings. A supply of lubricant for the bearings 3 consequently is always assured.

When the cap 19 of the oil reservoir 7 is removed for any purpose, as for replenishing the supply of lubricant within the reservoir, the pressure on the lubricant will be relieved, the tube 17 at that time being open to the atmosphere. Under these conditions, however, the lubricant in the bearings 3 and contained within the conduit 11 cannot be forced in a reverse direction by the air current in the tube 6, the pressure on the lubricant due to this air current under these conditions seating the check valve 14.

While I have described a specific application of my invention, it is to be understood that the same may be applied to bearings other than those for a rotating atomizer or fuel cup 1. It is to be understood, also, that the construction above described in detail may be varied within the purview of the invention.

What I claim is:

1. A lubricator for lubricating bearings which are under pressure and comprising a lubricant reservoir, a tube extending axially of the reservoir and having its lower end open to the source of pressure to which the bearing to be lubricated is subjected, the upper end of said tube extending above the level of the lubricant in the reservoir, said reservoir being formed interiorly with two chambers, one above the other and in constant communication with each other, a conduit leading from the lower of said chambers for conducting lubricant from said chamber to the bearing to be lubricated while said bearing is under pressure, and a check valve on the outer end of said conduit and closing toward the reservoir.

2. A lubricator for lubricating bearings which are under pressure and comprising a lubricant reservoir formed interiorly with upper and lower chambers in constant communication with each other, a tube extending axially of the reservoir and fixedly mounted therein, the lower end of said tube being in constant communication with the pressure to which the bearings to be lubricated are subjected, the upper end of said tube extending above the level of the lubricant in the upper of the interior chambers of the reservoir, a conduit opening into the lower of said chambers, a check valve adjacent the outer end of said conduit and closing toward the reservoir, a removable cap for the reservoir, said check valve closing automatically by the pressure on the bearings when said cap is removed to prevent movement of the lubricant out of said bearings to said reservoir.

3. A lubricator for lubricating bearings which are under pressure comprising a reservoir for lubricants, formed interiorly with upper and lower chambers in constant communication with each other, a removable cap for the reservoir, a tube open at each end extending axially of the reservoir from the bottom thereof to a point above the level of the lubricant in the upper chamber of the reservoir, the lower end of the tube communicating constantly with the pressure supply to which the bearings to be lubricated are subjected, a conduit opening into the lower of said reservoir chambers for conducting lubricant therefrom to the bearings, a check valve adjacent the outer end of said conduit and closing toward the reservoir, said parts being so disposed and arranged that with the removable cap of the reservoir in place the pressure to which the lubricant in the reservoir is subjected is not less than the pressure exerted by the pressure on the bearings to be lubricated, said check valve closing automatically under the pressure thereon in a direction from the bearings toward the reservoir when said cap is removed.

This specification signed this 29th day of June, 1927.

RALPH S. THORESEN.